United States Patent [19]

Lynn et al.

[11] 4,253,711
[45] Mar. 3, 1981

[54] SEALED LINED BEARING

[75] Inventors: William F. Lynn; Gordon M. Walker, both of Renton, Wash.

[73] Assignee: The Boeing Company, Seattle, Wash.

[21] Appl. No.: 973,465

[22] Filed: Dec. 26, 1978

Related U.S. Application Data

[60] Division of Ser. No. 895,331, Apr. 11, 1978, Pat. No. 4,190,302, which is a continuation of Ser. No. 725,808, Sep. 23, 1976, abandoned, which is a continuation-in-part of Ser. No. 576,491, May 12, 1975, Pat. No. 4,055,369.

[51] Int. Cl.³ .............................................. F16C 33/74
[52] U.S. Cl. ..................................... 308/36.1; 308/238
[58] Field of Search ................. 308/36.1, 187.2, 187.1, 308/187, 72, 74, 75, 238, 237 R; 277/30, 100

[56] References Cited

U.S. PATENT DOCUMENTS

| 2,221,554 | 11/1940 | Okun | 308/187.1 |
| 2,298,463 | 10/1942 | Burt | 308/187.2 |
| 3,848,938 | 11/1974 | Stella et al. | 308/36.1 |
| 4,055,369 | 10/1977 | Lynn et al. | 308/187.1 |

Primary Examiner—Lenard A. Footland
Attorney, Agent, or Firm—Morris A. Case; Bernard A. Donahue

[57] ABSTRACT

A resilient seal material is compressibly held against the side of a lined bearing at the juncture between the inner and outer race of the bearing with a formed ring fastened to the side of the outer race.

4 Claims, 13 Drawing Figures

SEALED LINED BEARING

This is division of Ser. No. 895,331, 4/11/78, now U.S. Pat. No. 4,190,302 which was a continuation of Ser. No. 725,808, filed 9/23/76 abandoned, which was a continuation-in-part of application Ser. No. 576,491 filed May 12, 1975, U.S. Pat. No. 4,055,369.

BACKGROUND OF THE INVENTION

Self-aligning spherical bearings with the bearing surface of a fabric lining such as teflon (polytetrafluorolthylene) are used extensively for service requiring a high load factor, at low r.p.m.'s. These bearings are particularly attractive as having freedom from periodic lubrication, high load capacity, self-aligning capability, and freedom from catastrophic failure modes such as seizure. These types of bearings have long service life under heavy loads. However, if the bearing is exposed to contaminants such as hydraulic fluid, anti-icing fluid, or abrasive solids, the service life of the bearing may be greatly reduced. Various types of seals are being used to attempt to seal out contaminants. In Schmidt, U.S. Pat. No. 3,588,201, the outer race is modified to have an inwardly directed annular groove near each side to retain a composite sealing ring of a metal ring encased in an elastomeric rubber to extend between and seal off the area between races. In Connolly, U.S. Pat. No. 2,814,538, a thin ring of nylon is deflectively extended between the two races and is held in place with snap rings seated in annular grooves in the outer race. A sealing device was discovered that effectively seals conventional lined bearings.

SUMMARY OF THE INVENTION

A metal ring with an inside diameter about the same as the average outside diameter of the exposed part of a bearing inner race is rigidly fastened to the side of the outer race. An enclosed annular void is created, bounded by the inner face of the metal ring, the side face of the outer ring, the side of the lining, and the spherical outer surface of the inner ring. At the point of juncture between the two races the side of the outer race may be chamfered to create a recess. The ring is deflected outward near its inner diameter to define a space behind the deflected ring, bounded by the side of the outer race, the side of the lining, and the spherical surface of the inner race.

The space behind the deflected ring is filled with a resilient material such as, but not limited to, a silicone rubber.

A lined bearing having cylindrical surfaces between an inner and outer race has the outer surface of the inner race tapered near each end. A seal is effected on these cylindrical bearings with a metal ring extending from the side of the outer race and bowed outward to extend toward the tapered surface on the inner race and confine a resilient seal material between the ring and the juncture between the inner and outer race of the bearing.

If a lined bearing has limited inner race exposure, an undercut annular recess is machined in the side of the outer race and adjacent to the inner race. A ring is fastened inside to nearly fill the recess with the ring having an inclined plane extending from the side of the recess to the outer surface of the inner race to exert pressure against a resilient seal material at an oblique angle with respect to the axis of the bearing.

The resilient seal material, held in place with a ring, is preferable formed in situ against the side of lined bearing to reflect the exact contour of the bearing. A forming tool is used in combination with the actual bearing to shape the resilient seal material.

It is an object of this invention to increase service life of plain spherical and cylindrical bearings operating in conditions subject to contamination.

It is another object of this invention to seal contaminants out of plain spherical and cylindrical bearings.

It is yet another object of this invention to seal in debris from the lining of plain spherical and cylindrical bearings.

It is another object of this invention to increase service life in all plain spherical and cylindrical bearings.

It is another object to form a ring of resilient material in situ against the side of a plain bearing.

DETAILED DESCRIPTION

Figures 1, 2, 3:
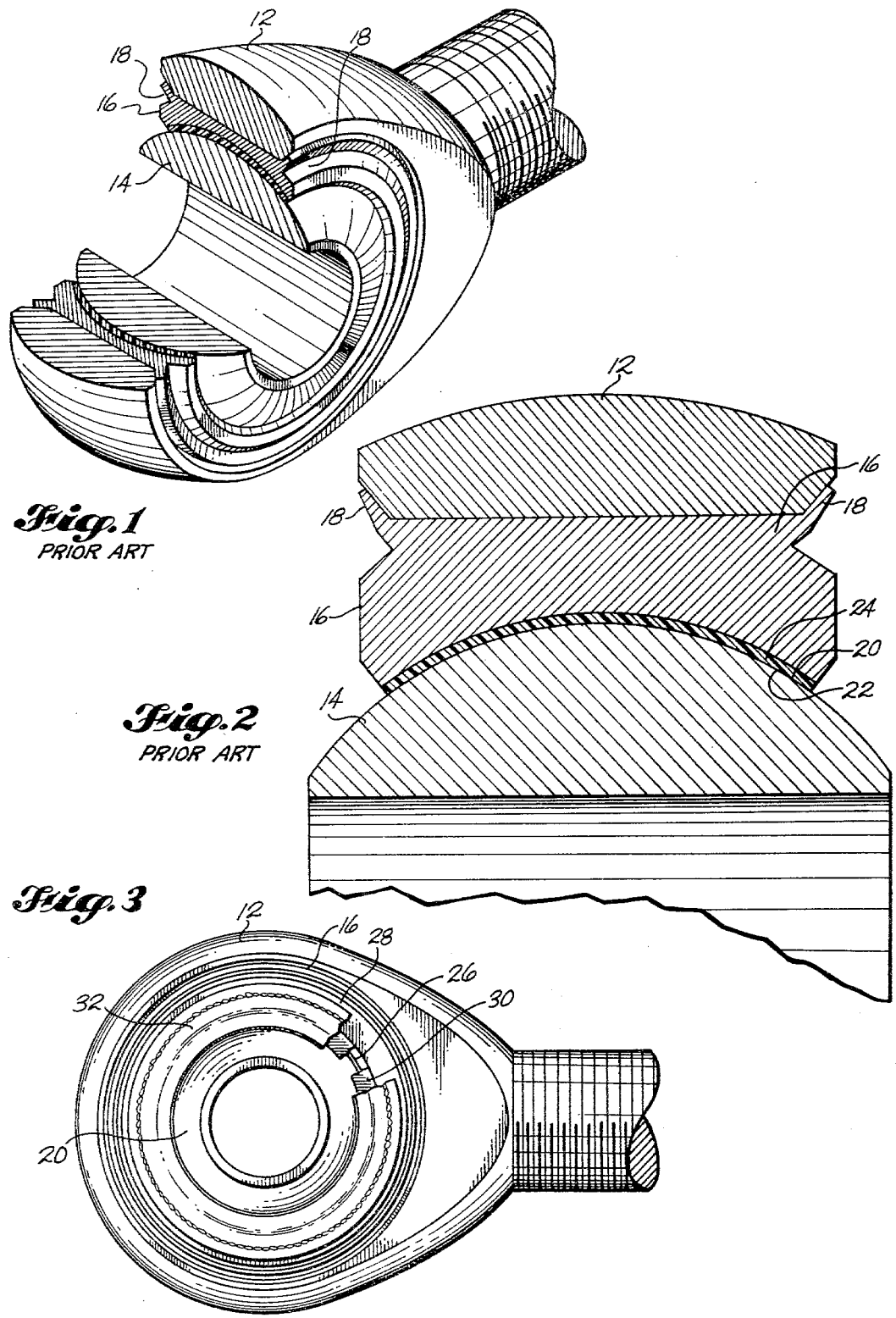
FIG. 1 shows a perspective view partially in section of a spherical bearing mounted in a rod end housing.
FIG. 2 shows a partial blown up sectional view of the bearing of FIG. 1.
FIG. 3 shows a side elevational view of the bearing of FIG. 1 with a seal, partially cut away, as practiced by this invention.

In FIGS. 1 and 2, a spherical bearing 10 is mounted inside a housing 12. The bearing has an inner race 11 and an outer race 16. In this configuration, the outer race has a staking groove 18 along each side; however, this groove may or may not be present, but is shown to illustrate this invention may be practiced in all conventional spherical bearings including those having a staking groove. The outer surface 20 of the inner race is spherical in shape, and matches the inner surface 22 of the outer race. This surface is covered with a bearing material 24 which acts as a liner and is tightly adhered to the outer race. The bearing material may be any material such as babbit, or bronze, but preferably is polytetrafluorolthylene, otherwise known as TFE. The liner is preferably a TFE fabric filled and bonded to the outer race with an adhesive resin.

Figure 4:
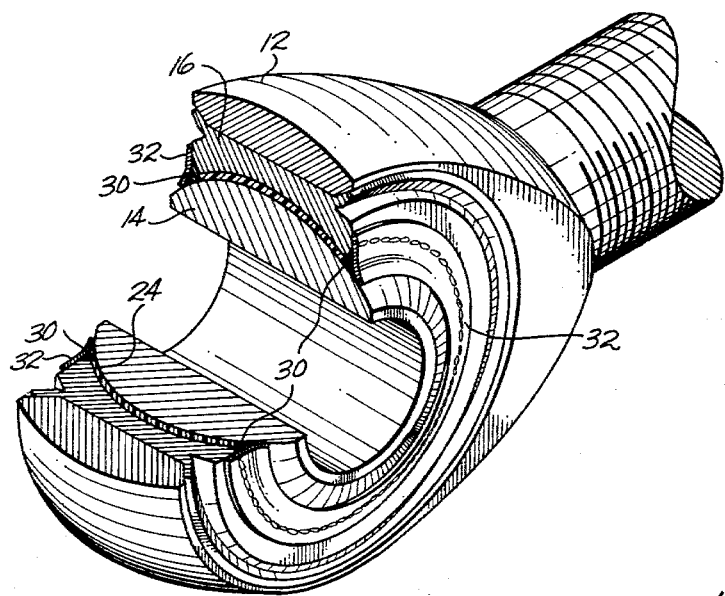
FIG. 4 shows a perspective view partially in section of a sealed bearing.
Figure 5:
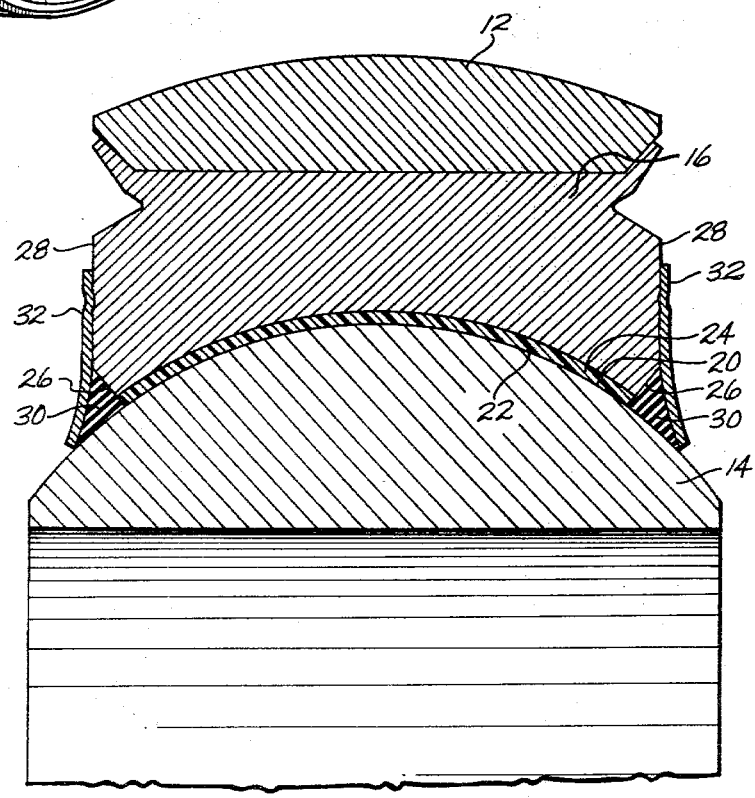
FIG. 5 is a blown up sectional view of the sealed bearing of FIG. 4.

FIGS. 3, 4, and 5 show the same bearing with the seals of this invention in place. The same numbers, therefore, will be shown for identical parts in the sealed and the unsealed bearings.

A chamfer 26 is located along each side 20 of the outer race at the juncture between the two spherical surfaces. This chamfer creates a pocket into which a resilient sealing material 30 is urged by retaining ring 32. The retaining ring is rigidly held against the sides of the outer race and extends to the inner race spherical surface 20. The inner diameter of the ring is sized to approximate the average diameter of the exposed part of the inner race. Thus, the ring extends about half way down the outer surface 20, and the ring is bowed out near its inner diameter. The resilient sealing material is held behind the bowed ring, is continually pressed into the pocket or recess between the chamfered part of the outer race and the outer diameter of the inner race. It is believed this seal is effective by not only keeping contaminants away from the bearing surface, but also slows the loss of debris from the wearing of self-lubricating lined bearings or keeps the lubricant in on the lubricated type of spherical bearing. In a self-aligning bearing, the depth of the ring is preferably sized to extend inward as far as possible and still allow about 5 degrees of misalignment of the bearing. To install the seal it is preferable to place resilient seal material against a side of the ring near its inside diameter, to press the ring near its outer diameter against the side of the outer race and attach the ring in place, preferably by spot welding.

A spherical bearing lined with TFE is found to operate well under heavy loads, is self-lubricating, and has a long wear life under conditions where it is free from contaminants. When subjected to contaminants, its wear life may be greatly reduced.

Cycles of oscillation versus wear tests were performed using various materials that might be present as contaminants when a bearing is used in aircraft service.

Figure 6:
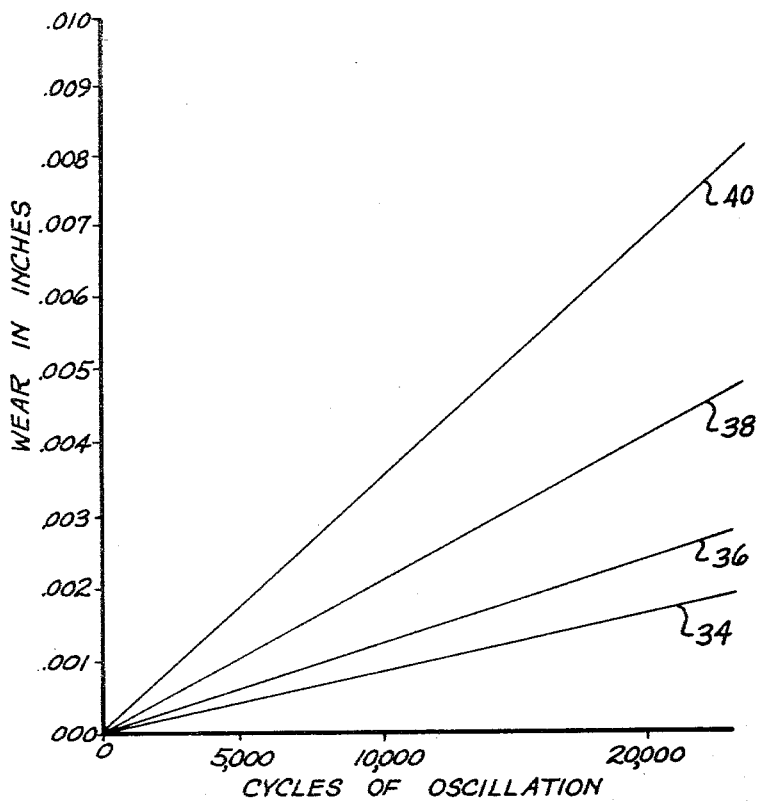
FIG. 6 shows a graph depicting wear of a spherical bearing.

FIG. 6 shows the results of some of the tests performed on bearings without the use of a seal. The tests shown by line 34 were free of contaminants. All the other tests were performed while exposed to various contaminants. Tests shown by line 36 were exposed to a mixture of silica flour, aircraft cleaner, water, anti-icer, hydraulic fluid and kerosene; tests shown by line 38 were exposed to hydraulic fluid, and tests shown by line 40 were exposed to an anti-icer of ethylene glycol and alcohol.

Test conditions were all performed under a load of 16,650 p.s.i., with an oscillation of ±20 degrees and a cycle rate of 100 cycles per minute.

Figure 7:
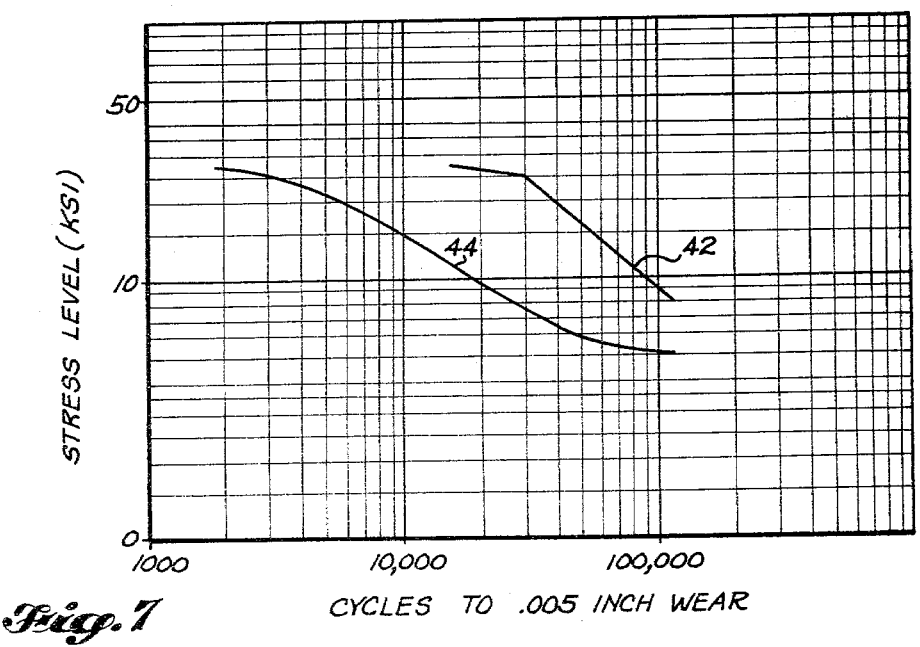
FIG. 7 is a graph showing stress life comparison of a sealed and an unsealed spherical bearing.

Additional tests were performed to determine the load life of TFE lined spherical bearings with the seal of this invention and without any seal when exposed to an anti-icing contaminant during the test. Test conditions called for ±20 degree oscillation at 100 cycles per minute. The load was varied and the number of cycles determined at the point where the bearing liner experienced a wear of 0.005 inches. The results of those tests are shown in FIG. 7. That graph shows the sealed bearings as represented by line 42 were far superior to unsealed bearings as represented by line 44.

Figure 8:
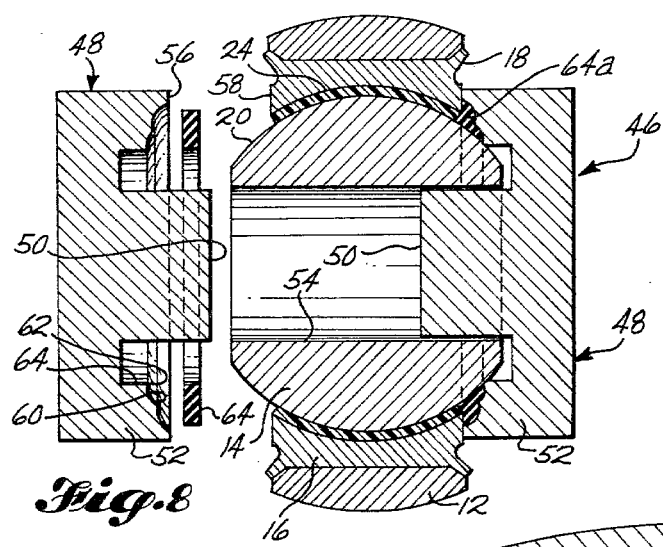
FIG. 8 shows a cross sectional end view of a tool and bearing used in this invention to form a resilient seal ring.

FIG. 8 shows the bearing of FIGS. 1 and 2 being used in combination with a tool 46 for forming a resilient seal in situ against the side of the bearing. The tool is made up of a pair of identical disk shaped members 48 facing each other and having axially extending concentric members 50 and 52. The central member 50 is cylindrical in shape and sized to snugly fit into bore 54 of the inner race 14 to align the tool with respect to the bearing. The outer member 52 is annular or ring shaped and has a radial surface 56 which contacts the side 58 of the outer race 10 of the bearing when the tool is fully bottomed in the bearing. A shaped recess 60 extends from the radial surface to an edge 62 at the inner diameter of the outer ring shaped member 52. The edge is positioned to contact the outer surface 20 of the inner race 14 when the radial surface 56 contacts the side 58 of the outer race 16. To form a resilient ring shaped member, a ring 64 of the resilient material is positioned between the tool member and the bearing and the tool is moved toward the bearing and bottomed out to form the shaped resilient member 64a which exactly matches the contour of the side of the outer race, the side of the lined bearing material, and the outer surface of the inner race at the juncture between those members. A pair of resilient members may be formed simultaneously by positioning the resilient sealing material on either side of the bearing and pressing the disk shaped members inward. This may be accomplished by pressing the bearing with tool in a press not shown to bottom out the tools and form the resilient members 64a.

Figure 9:
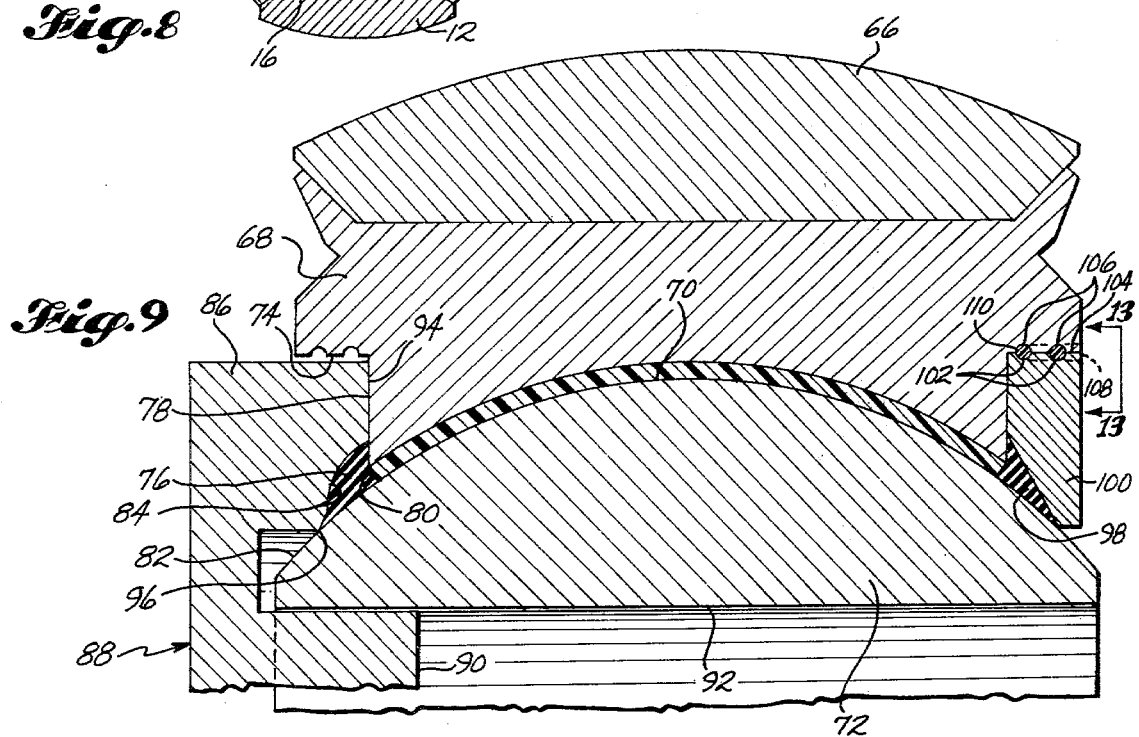
FIG. 9 shows a blown up cross sectional end view of a different embodiment of the sealed bearing of this invention with one side of the bearing showing a tool forming a resilient seal ring.
Figure 13:
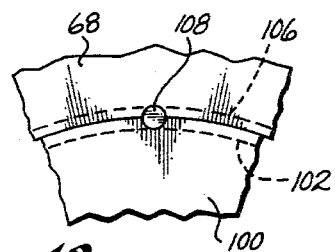
FIG. 13 shows a fragmented side elevational view looking in the direction of line 13—13 of FIG. 12.

FIG. 9 shows a different embodiment of a sealed spherical bearing having a housing 66, outer race 68, a lining of bearing material 70 adhered to the outer race and an inner race 72. The outer race has an undercut side adjacent the inner race to form a cylindrical shaped recess 74. The left side of that drawing shows a resilient seal material 76 formed between a side 78 of the undercut outer race, a side 80 of the lining 70, the outer surface 82 of the inner race 72 and a contoured side 84 of an outer ring member 86 of a tool member 88 which also has an inner extension member 90 to snugly fit into the bore 92 of the inner race 72. When the tool is bottomed out, a radial surface 94 of the outer ring member and edge 96 contact the side 78 of the outer race and the outer surface 82 of the inner race 72 respectively to form the resilient seal. The right hand side of the drawing shows the positioned seal 76 compressed by a tapered side 98 of a ring 100 which fills the recess 74. The ring has a pair of annular recesses 102 extending around the outer periphery 104 which are located to be contiguous to a pair of annular recesses 106 in the outer race with the ring fully bottomed in position. A hole 108 as shown in FIG. 13 communicates with the annular recesses to permit the introduction of an adherent material into the contiguous annular recesses to lock the members together. This may be any material which can be introduced in the liquid or powdered form that will set up to form a cohesive material such as, but not limited to, a resin such as epoxy, polyester, or polyethylene. In operation the resilient ring 76 is formed between the bearing and the forming tool 88. The tool is removed and ring 100 with tapered side 98 pressed against the outer race with the resilient ring 76 in position, and a reinforced resin injected through hole 108 into the annular space as defined by recesses 102 and 106. The resin sets up at 110 to join the tapered ring to the outer race and seal the bearing.

Figure 10:
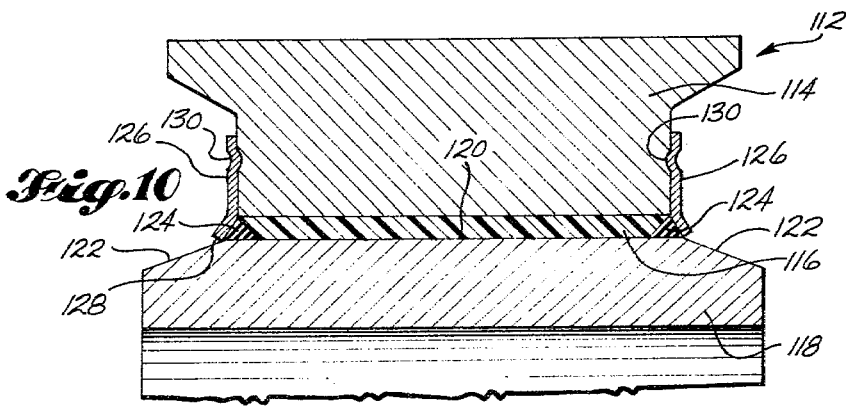
FIG. 10 shows cross sectional end view of a different embodiment of a sealed bearing of this invention.

FIG. 10 shows a sealed cylindrical shaped lined bearing 112 with outer race 114, a lining 116 bonded to the outer race and inner race 118. In this embodiment the outer surface 120 of the inner race is cylindrical in shape until a point is reached near the end of the race where the surface is tapered at 122. A resilient seal material 124 is held at the side juncture of the two races by a ring 126, which is bowed out so that its inner diameter 128 contacts the tapered surface 122. The ring is welded at 130 to the outer race to hold the seal material in place.

Figure 11:
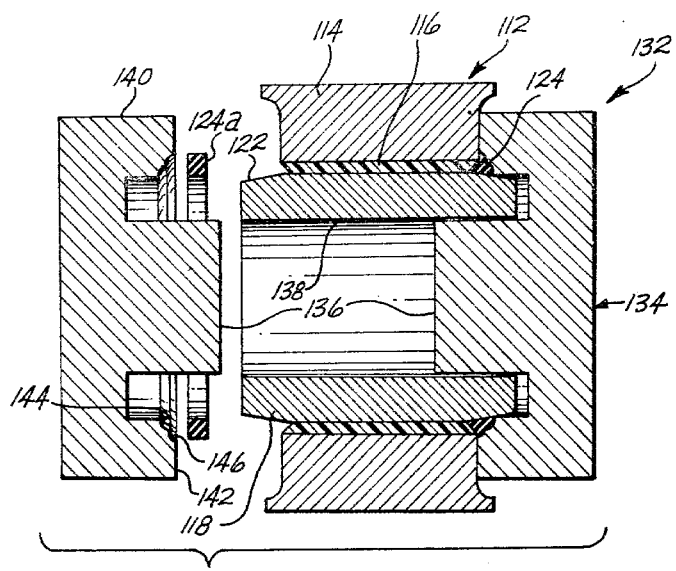
FIG. 11 shows a cross sectional end view of a tool and bearing used in this invention to form a resilient seal ring for the bearing of FIG. 10.

FIG. 11 shows the bearing 112 in combination with a forming tool 132 for forming the resilient seal material 124. The forming tool as a pair of facing members 134 with central projection 136 shaped to snugly fit in the bore 138 of the inner race 118. A concentric projection 140 has radial face 142, edge 144 with a contoured surface 146 extending between for forming the resilient member 124a into finished shape 124. Upon bottoming out, the forming tool edge 144 contacts tapered surface 122 of the inner race 118.

Figure 12:
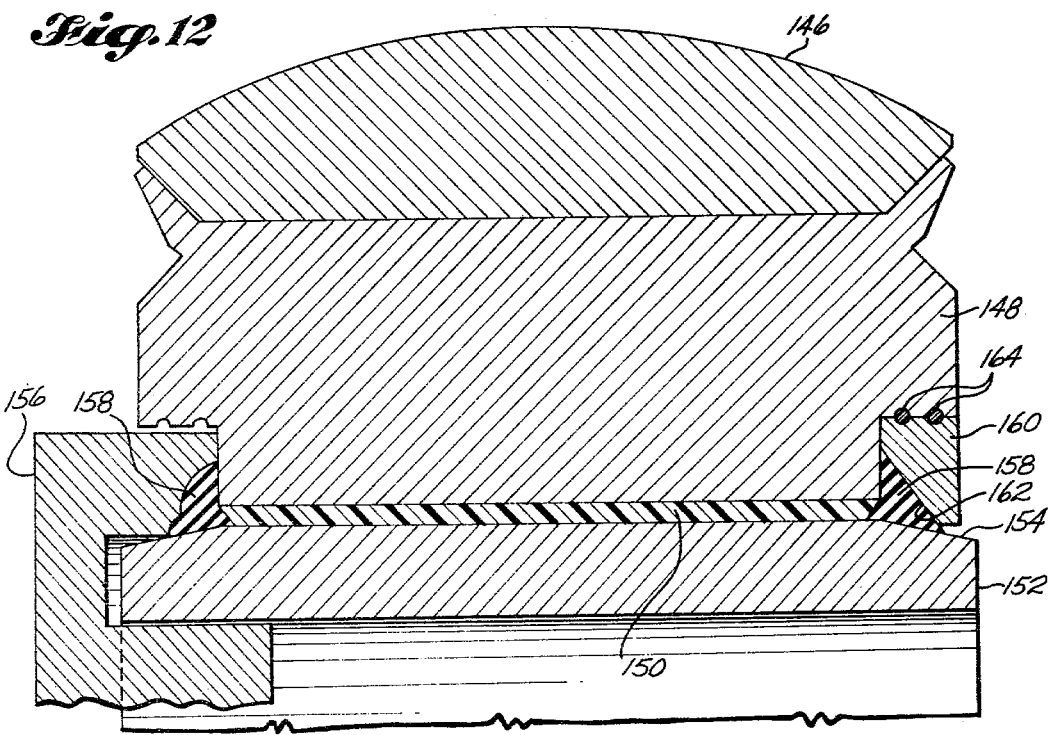
FIG. 12 shows a blown up cross sectional end view of yet another embodiment of the sealed bearing of this invention with one side of the bearing showing a tool forming a resilient seal ring.

FIG. 12 shows a bearing similar to the embodiment of FIG. 9 but with cylindrical surface races. This drawing has housing 146, outer race 142, bearing lining 150, inner race 152 with tapered outer surface 154. Tool member 156 is used in combination with the bearing to form resilient seal member 158 which is held in place with ring 160 having tapered side 162 which in turn is held in place with cohesive material 164.

We claim:

1. A sealed lined bearing comprising: an outer race having an undercut side adjacent an inner race, a ring partially filling the undercut part of the outer race and having a beveled inner side to extend outward from the outer race toward the inner race, a resilient material at the juncture between the outer race, a lining, and the inner race and compressibly held by the beveled side of the ring, and means for holding the ring in position.

2. A sealed lined bearing as in claim 1 further comprising: the ring having at least one recess around an outer periphery, an inside periphery in the undercut portion of the outer race having a recess contiguous to the recess in the ring when the ring is positioned, and a plastic material to fill the recesses and having cohesive integrity to hold the ring to the outer race.

3. A sealed lined bearing as in claim 1 wherein surfaces between inner and outer races are spherical and the beveled side of the ring extends to the spherical surface of the inner race.

4. A sealed lined bearing as in claim 1 wherein surfaces between the inner and outer races are cylindrical, the inner race outer surface tapers inwardly at an end, and the beveled side of the ring extends to the tapered surface on the inner race.

* * * * *